United States Patent [19]

Bowling et al.

[11] Patent Number: 4,498,390
[45] Date of Patent: Feb. 12, 1985

[54] METHOD AND APPARATUS FOR EMBOSSING FOIL

[75] Inventors: James A. Bowling, Midlothian; Wallace M. David, Richmond, both of Va.

[73] Assignee: Philip Morris Incorporated, New York, N.Y.

[21] Appl. No.: 299,262

[22] Filed: Sep. 3, 1981

Related U.S. Application Data

[63] Continuation of Ser. No. 148,316, May 9, 1980, abandoned.

[51] Int. Cl.³ .............................................. B41F 31/02
[52] U.S. Cl. ........................................ 101/365; 101/6
[58] Field of Search .................... 101/365, 6; 156/161, 156/163, 164, 167, 220, 219

[56] References Cited

U.S. PATENT DOCUMENTS

| | | | |
|---|---|---|---|
| 2,851,372 | 9/1958 | Kaplan et al. | 101/32 |
| 2,855,844 | 10/1958 | Stewart | 101/23 |
| 3,247,785 | 4/1966 | Shultz | 101/32 |
| 3,771,213 | 11/1973 | Peraro | 156/71 |

Primary Examiner—Richard J. Apley
Assistant Examiner—David Isabella

[57] ABSTRACT

A method and apparatus for embossing foil to produce warp-free, textured packaging sheet. The method comprises the forming of bosses in the foil while firmly supporting the foil clamped on rigid lands at the perimeter of the boss to be formed. Drawing the foil between rigid male and female walls of a forming cavity while so held, and interposing a sheet of yieldable material between the surface of the female portion of the cavity and the sheet of foil to produce a yieldable matrix against which the foil comes to rest.

9 Claims, 4 Drawing Figures

METHOD AND APPARATUS FOR EMBOSSING FOIL

CROSS-REFERENCE

This is a continuation of Ser. No. 148,316, May 9, 1980, now abandoned

BACKGROUND OF THE INVENTION

Textured foil of the type to which this invention applies is used in packaging of commodities and appears most often in the make-up of retail packages. An example of this type of foil is found in packages designed for marketing of cigarettes. The metallic part of the foil forms an excellent vapor barrier and is desired for this purpose as well as for wrapping and adding attractiveness to the appearance of a pack of cigarettes. In the operation of cigarette packaging machinery it is usual to advance a foil-paper laminate into the equipment at a rate sufficient to supply each pack of cigarettes with the amount of foil necessary to make up a given package. The foil component is combined cooperatively with other components to make up a complete cigarette pack containing a standard number of cigarettes. The package is overwrapped and sealed to make it air tight then placed in a carton.

The prior art devices for processing the foil to emboss it comprise texturing rolls which are of cooperating complementary male and female die members arranged to rotate into register for forming bosses in the foil at the nip of the forming rolls. In one such device, the pair of rolls consist of one roll made with rigid male forming plugs. This is caused to run in compressive contact along a nip line against a roll surface with a resilient polyurethane covering. The foil is pressed into the yieldable surface of the polyurethane covered roll by the male forming bosses to form bosses in the foil.

These above methods are widely used in cigarette making and packaging machinery, but an inherent problem associated with the feeding of the textured foil is caused by the tendency of the textured foil made by former methods to curl and cause it to be difficult to guide through automatic machinery. Tendency to curl requires that more highly engineered guide and control features be provided than for a foil which lies flat. A flat foil will advance a greater distance through packaging machinery without the need for excessive guiding and controlling apparatus specially made for the express purpose of keeping the foil flat while it is manipulated in automatic handling.

SUMMARY OF THE INVENTION

It is an object of the present invention to provide a method for embossing a sheet of foil to produce a textured sheet relatively free of an inherent tendency to curl.

It is a further object of the present invention to provide apparatus for implementing the above method of this invention.

The present invention achieves the production of relatively curl-free textured foil by embossing the foil while localizing the effects of lateral dimensional deformation in the foil to the immediate surface area of each individual boss. By this is meant that in drawing the foil to produce an individual boss, the surrounding perimeter about the base of the boss is held in place, stabilized dimensionally, and is maintained so while the final drawing of the boss takes place. A male die in contact with the foil presses against the foil to drive and draw it into a complementary rigid walled female die to form the boss. The yieldable material is made to interlie the opposite surface of the foil and the surface of the female portion of the forming die. The yieldable material deforms uniformly along with the foil being drawn to provide a cushioned surface mating area between the surface of the foil and the walls of the female die.

The compressive characteristics of the yieldable material are such as to distribute the compressive forces uniformly over the stressed area of the foil under contact for drawing it into conformity with the general form of the walls of the individual female die cavities. Thus the foil is relatively unimpeded in its freedom to deform yet is resiliently and forgivingly supported in the desired final configuration between the forming members. In this manner only that area of foil which is included within the perimeter of each boss is apt to be affected in lateral dimension while being drawn to form a particular boss. A minimum of curling is thus imparted to the rest of the sheet of foil as embossing action proceeds. Since the drawing action for each boss is localized, an uneven lateral distention of the bulk of the sheet of foil is held to a minimum.

DESCRIPTION OF THE PREFERRED EMBODIMENTS

Figure 1:
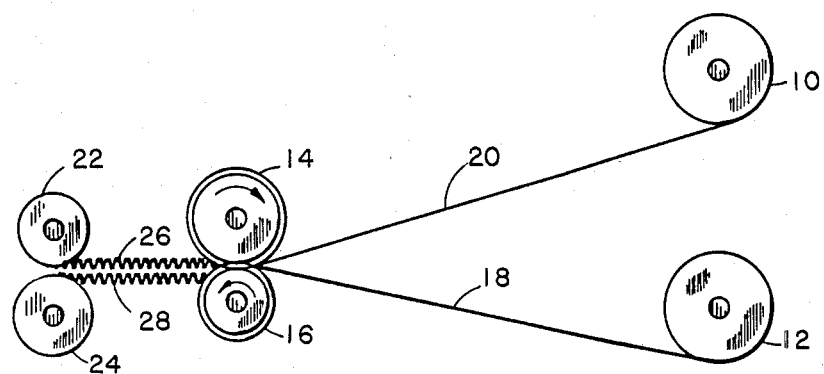
FIG. 1 is a side view in elevation showing a pair of embossing rolls and buffer material and foil feed bobbins.

Referring now more particularly to the drawings and specifically to FIGS. 1–4 thereof, the apparatus of FIG. 1 includes rotatable supply rolls or coils 10 and 12 commonly referred to as bobbins in cigarette manufacturing nomenclature. Bobbin 12 carries a supply of a metallic foil 18, such as aluminum foil, in strip form of a width suitable to a pre-selected use, and bobbin 10 carries a supply of resilient or deformable buffer material 20, such as paper or plastic sheet material. The metallic foil may be of a range in thickness of from 0.001" to 0.030" and of a surface quality preselected to produce a desired effect after embossing. The thickness of the buffer material 20 may vary in thickness of up to ten times the thickness of the foil as is found to be best by experiment for a particular foil thickness.

While the present invention will be described as being applied to embossing of metallic foil, and particularly for cigarette packaging, it will be understood that the material to be embossed may be used for any purpose and may be made of any ferrous or nonferrous metal or combinations thereof. Plastic or paper materials to which a metallic coating has been applied may also be used. It is also contemplated that the present invention may be practiced in connection with the use of heat applied directly to the foil by suitable means such as infrared, hot air or other heating means not shown to facilitate and enhance embossing action. Heat may be applied directly to the material as stated above or by heating of the embossing rolls 14 and 16 in some conventional fashion of heating, not shown herein.

The foil material 18 to be embossed is shown as coiled in FIG. 1 on bobbin 12 from which it is fed layered with the resilient buffer material 20 from bobbin 10 into the nip of a pair of tangential embossing die rollers 14 and 16, the impression roller 14, and the embossing roller 16. Both rollers are made of relatively hard material. The rollers 14 and 16 are driven by suitable means, not shown, to rotate in the direction of the arrows shown in the drawings. The foil 18 and the buffer material 20 pass between the rollers 14 and 16 to pressure-form the foil 18. Take-up rollers 24 and 22 receive and store the embossed foil 28 and the spent buffer material 26 respectively.

Figure 2:
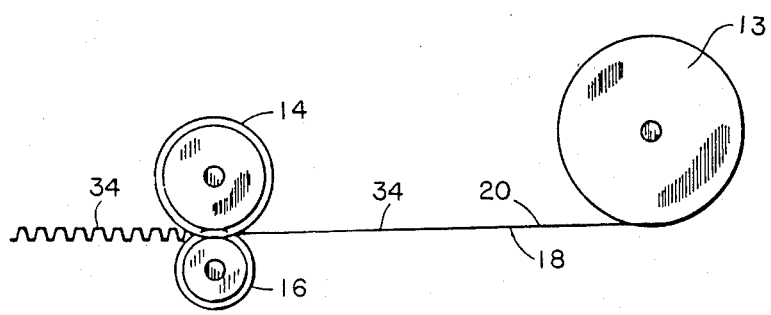
FIG. 2 is a side view in elevation showing the embossing rolls of FIG. 1 and a feed bobbin of prelaminated foil.

FIG. 2 illustrates the use of a prelaminated foil 34 being drawn from feed bobbin 13. Laminate 34 includes a layer of foil 18 and a layer of buffer material 10 which may remain laminated subsequent to embossing as illustrated in FIG. 2 as well as in FIG. 3 and FIG. 4.

Figure 3:
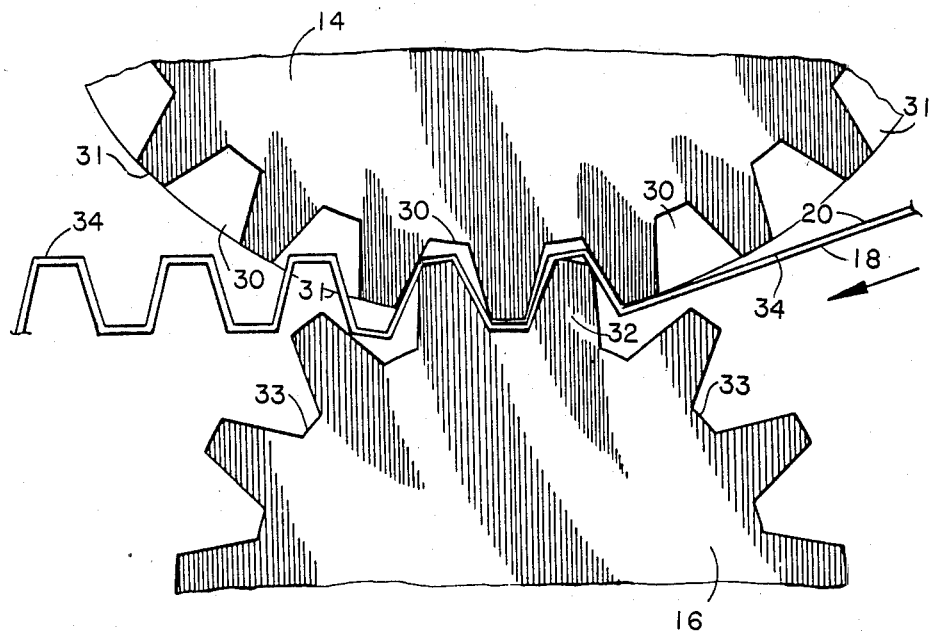
FIG. 3 is a view in elevation showing an enlarged detail of the embossing rolls of FIGS. 1 and 2.
Figure 4:
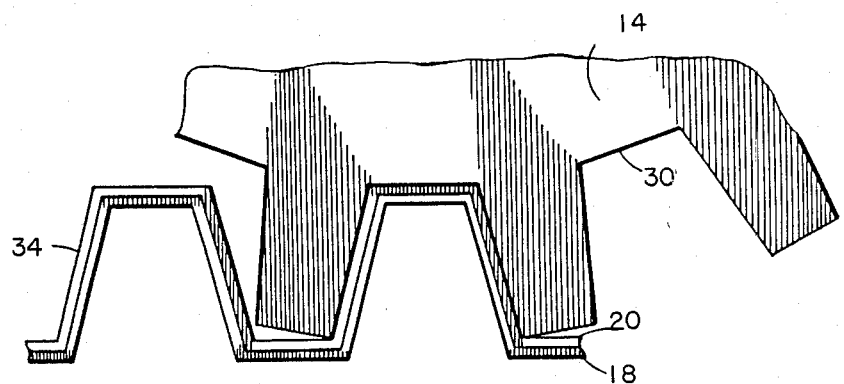
FIG. 4 is an enlargement of a single pair of embossing dies with foil in place.

As best seen in FIG. 3 and 4, the foil 18 is extruded or drawn into the female cavity 30 of the female impression roller 14 by the raised boss portion 32 of the male embossing roll 16.

The depressed portions are made of the configuration designed to result in the particular decorative and structural effect intended for a particular purpose.

Particular care is taken in preparing the embossing rolls to guarentee that a non-curling foil is produced at their nip. In order to achieve this, it is critical that very accurate register is had between the individual bosses and their complementary female recesses.

The embossing rolls are made of different diameters with the male projections on the smaller roll. The use of a roll of smaller diameter to carry the male die portions is found to achieve improved results over rolls having equal diameters.

In preparing a pair of rolls, first a steel roll, preferably the smaller roll, is machined or etched with the desired pattern as represented in multiple arrangements of male bosses which protrude from the surface uniformly about the periphery of the roll 16. The smaller roll is then hardened and tempered. A second roll 14 of larger diameter is prepared with a uniformly ground smooth surface. The rolls are then mounted with their axes in a common plane and means, not shown, are provided for causing the two rolls to meet at the nip under pressure. The two rolls are rotated under controlled pressure contact until the pattern of male protrusions on the smaller roll is duplicated in complementary recesses impressed in the surface of the larger roll.

In order to guarantee continued perfect register, registration constancy zones, not shown, which act like gear drive teeth are provided about the roll peripheries for a short distance inwardly from the ends of the rolls. These consist of areas of repetitively duplicated bosses and recesses which provide the equivalent of a gear toothed drive and which resemble an embossing pattern but which are individually much larger than the bosses and recesses of the embossing pattern. They act as a very fine toothed drive mechanism in which back-lash is practically eliminated, and driving noise and vibration are held to a minimum.

Extreme care is exercised in transferring the patterns on the embossing and driving male roll to the surface of the female roll. The relative diameters of the rolls are calculated to insure that the circumferences of the separate rolls are such that the male and female portions match evenly with no gaps or improper matching and registration of any set of recesses.

In practice, the foil laminate is fed into the nip of the rolls at high speed and is driven through while receiving the desired impression of the pattern as designed. As stated above, a suitable set of apparatus of conventional design for applying spring pressure, not shown, is provided for maintaining adjustably a range of desired pressures for urging the rolls into contact at the nip.

Referring now to FIG. 3, it will be seen that the laminate 34 is advanced in the direction of the arrow to interlie the bosses and recesses of the nip of the rolls 14 and 16. The inner wall of the recess 30 is shown as receiving the yieldable portion 20 of the laminate 34 which is compressed within the nip provided at the line of greatest proximity of the boss 32.

The progressive action of clamping at the perimeter of the boss to be formed and subsequent drawing of the foil while being advanced through the nip between the circumferentially disposed lands 31 and 33 of the rolls between the recesses, together with the localized drawing action on the foil by the constantly reducing separaton of the mating bosses 32 and recesses 30 as rotation proceeds, limits the deformation of the foil area to the local area of the individual bosses.

As stated, this yieldable clamping and drawing action results in localized deformation of the foil. In effect this establishes the raised pattern without substantially aberrating the uniformity of over-all lateral displacement of the sheet of foil area-wise during the drawing of the individual bosses therein. The foil is thus protected against undue non-uniform stress area-wise and physical damage at each boss by presence of the yieldable layer 20 which cushions and protects the foil against harsh compressive massaging of a damaging sort.

In this fashion, a relatively curl-free sheet is produced which can more accurately and conveniently be fed through package forming machinery with a minimum of problems which normally are associated with curling of the foil.

Having described the preferred mode of carrying out my invention and bearing in mind that this description is to be considered for illustrative purposes without limiting the scope of my invention to the disclosure made herein,

What is claimed is:

1. A method of embossing a sheet of metallic foil in at least one pair of complementary embossing dies having male and female die portions comprising:
    a. providing a sheet of compressible deformable material;
    b. layering said compressible deformable sheet with a sheet of said metallic foil;
    c. placing said sheets between said male and female die portions with the metallic foil surface facing the male die portion
    d. bringing said die portions together under pressure with male and female portions in register to compress said metallic foil against a surface of a die portion with yieldable force.

2. The method of claim 1 further comprising:
    a. providing clamping means for holding foil immobile against lateral movement adjacent the perimeter of said individual die portions; and
    b. clamping areas of said foil adjacent the perimeter of said individual die portions while pressing said foil within said dies for embossing said foil.

3. The method of claim 1 wherein the metallic foil face is pressed against by the male portion of said pair of dies and said compressible-yieldable sheet is pressed into the female portion of said set of dies.

4. The method of claim 1 wherein said layer of foil is laminated and bonded to said compressible deformable sheet.

5. The method of claim 1 wherein said foil is a metallic coating on a surface of said compressible deformable material.

6. A method of embossing sheets of metallic foil in at least one pair of embossing rolls having complementary pairs of male and female dies in the respective surfaces thereof comprising the steps of:
   a. providing a first roll of a given diameter with female cavities in the surface thereof,
   b. providing a second roll of a smaller diameter than the first roll and with male die portions complementary to the female die cavities in the said first roll,
   c. providing means for driving said first and second rolls while in yieldable contact at a nip therebetween at different relative surface speeds so as to cause accurate register of said male die portions on said second roll with respective female die cavities on said first roll,
   d. passing said sheet of foil through the said nip of said first and second rolls to emboss said foil,
   e. providing a sheet of yieldable non-metallic material,
   f. layering said non-metallic yieldable material with said foil and passing the layered combination through the nip of said rolls with the metallic foil surface facing said male portions of said second roll.

7. A method as in claim 6 wherein at least one of said rolls is heated.

8. A method of embossing a prelaminated material including a foil layer and a buffer material layer comprising the steps of:
   providing a female embossing roller having cavities formed in the surface thereof, said cavities being arranged to define a preselected pattern;
   providing a male embossing roller having bosses protruding from the surface thereof, said bosses being arranged to be complementary to said cavities and to meet in registry therewith;
   orienting said female embossing roller and said male embossing roller to provide a preselected clearance therebetween, said clearance being sufficient to effect embossing of the prelaminated material positioned therebetween;
   feeding the prelaminated material between the rollers with the foil layer positioned between said male embossing roller and the buffer material layer.

9. A method of embossing a foil material comprising the steps of:
   providing a female embossing roller having cavities formed in the surface thereof, said cavities being arranged to define a preselected pattern;
   providing a male embossing roller having bosses protruding from the surface thereof, said bosses being arranged to be complementary to said cavities and to meet in registry therewith; providing a buffer material;
   orienting said female embossing roller and said male embossing roller to provide a preselected clearance therebetween, said clearance being sufficient to effect embossing of the foil material and the buffer material positioned therebetween;
   feeding the foil material and the buffer material between the rollers with the foil material positioned between said male embossing roller and the buffer material.

* * * * *